United States Patent
Segev et al.

(10) Patent No.: US 9,078,131 B2
(45) Date of Patent: Jul. 7, 2015

(54) APPARATUS, SYSTEM AND METHOD OF COMMUNICATING LOCATION-ENABLING INFORMATION FOR LOCATION ESTIMATION

(71) Applicants: Jonathan Segev, Tel Mond (IL); Itai Steiner, Tel Aviv (IL); Avishay Sharaga, Bet Nehemya (IL)

(72) Inventors: Jonathan Segev, Tel Mond (IL); Itai Steiner, Tel Aviv (IL); Avishay Sharaga, Bet Nehemya (IL)

(73) Assignee: INTEL IP CORPORATION, Santa Clara, CA (US)

( * ) Notice: Subject to any disclaimer, the term of this patent is extended or adjusted under 35 U.S.C. 154(b) by 171 days.

(21) Appl. No.: 13/976,500

(22) PCT Filed: May 5, 2013

(86) PCT No.: PCT/US2013/039603
§ 371 (c)(1),
(2) Date: Jun. 27, 2013

(87) PCT Pub. No.: WO2014/182270
PCT Pub. Date: Nov. 13, 2014

(65) Prior Publication Data
US 2014/0331045 A1    Nov. 6, 2014

(51) Int. Cl.
*H04W 12/06* (2009.01)
*H04W 64/00* (2009.01)

(52) U.S. Cl.
CPC .............. *H04W 12/06* (2013.01); *H04W 64/00* (2013.01)

(58) Field of Classification Search
USPC .................. 713/168; 726/4; 380/45; 370/332
See application file for complete search history.

(56) References Cited

U.S. PATENT DOCUMENTS

| | | | |
|---|---|---|---|
| 2002/0080968 A1 | 6/2002 | Olsson | |
| 2006/0173612 A1* | 8/2006 | Steel | 701/207 |
| 2008/0089295 A1* | 4/2008 | Keeler et al. | 370/332 |
| 2008/0214213 A1* | 9/2008 | Etemad et al. | 455/456.6 |
| 2009/0275344 A1* | 11/2009 | Carlson et al. | 455/456.1 |
| 2010/0278335 A1* | 11/2010 | Enge et al. | 380/45 |
| 2011/0263277 A1 | 10/2011 | Zuniga Gallegos | |
| 2012/0144452 A1* | 6/2012 | Dyor et al. | 726/4 |
| 2014/0162683 A1* | 6/2014 | Rochberger et al. | 455/456.1 |
| 2014/0331045 A1* | 11/2014 | Segev et al. | 713/168 |

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012.

(Continued)

*Primary Examiner* — Joseph P Hirl
*Assistant Examiner* — Sayed Beheshti Shirazi
(74) *Attorney, Agent, or Firm* — Shichrur & Co.

(57) ABSTRACT

Some demonstrative embodiments include apparatuses, systems and/or methods of communicating location-enabling information for location estimation. For example, an apparatus may include a location-enabling information (LEI) processor to process a location-enabling message, which is transmitted between first and second location-enabling sources and receivable by a mobile device, the location-enabling message including encrypted LEI configured for enabling estimation of a location of the mobile device at a predefined accuracy based on a cryptographic key corresponding to the first location-enabling source.

30 Claims, 6 Drawing Sheets

(56) References Cited

OTHER PUBLICATIONS

IEEE Std 802.11ad™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications Amendment 3: Enhancements for Very High Throughput in the 60 GHz Band, Dec. 28, 2012.

Wireless Gigabit Alliance (WGA) Specifications; WiGig MAC and PHY Specification Version 1.1, Apr. 2011—Final Specification; 442 pages.

Wi-Fi Alliance Technical Committee P2P Task Group; Wi-Fi Peer-to-Peer (P2P) Technical Specification; Version 1.2; Oct. 4, 2010, 160 pages.

Open Mobile Alliance; Secure User Plane Location Architecture; Approved Version 2.0; Apr. 17, 2012; OMA-AD-SUPL-V2_0-20120417-A; 51 pages.

Open Mobile Alliance; Mobile Location Protocol 3.3; Candidate Version 3.3; Aug. 31, 2010; OMA-TS-MLP-V3_3-20100831-C; 138 pages.

W3C; Geolocation API Specification; W3C Proposed Recommendation May 10, 2012; 18 pages.

IEEE 802.11-13/0072r0; Client Positioning using Timing Measurements between Access Points; Jan. 12, 2013; 13 pages.

International Search Report and Written Opinion for PCT Application No. PCT/US2013/039603, mailed on Feb. 18, 2014, 16 pages.

\* cited by examiner

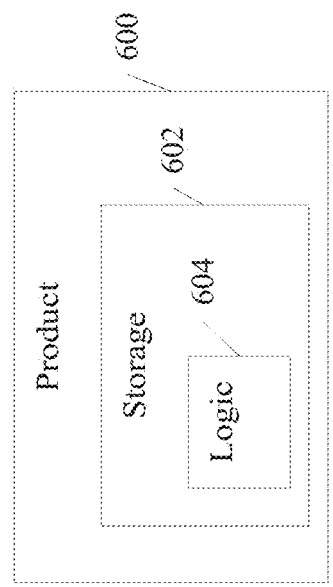

APPARATUS, SYSTEM AND METHOD OF COMMUNICATING LOCATION-ENABLING INFORMATION FOR LOCATION ESTIMATION

CROSS REFERENCE

This application is a National Phase Application of PCT International Application No. PCT/US2013/039603, International Filing Date May 5, 2013, the entire disclosure of which is incorporated herein by reference.

BACKGROUND

Continuous location awareness is a highly desirable feature in modern devices. This capability is required, for example, to support location-based applications, Contextual Aware Computing and/or a multitude of Location Enabled Services (LES) applications, which require location updates, either periodic or sporadic/one time.

Various methodologies may be implemented for determining the location of a mobile device. Trilateration is a way of determining location using the locations of a plurality of other devices, generally referred to as location origins or location sources, e.g., cellular base stations, Access Points (APs), and the like.

A location estimation method may include measuring wave propagation parameters, e.g., Time of Flight (ToF) parameters, with respect to a location origin; estimating a distance between the mobile device and the location origin based on the measured parameters, and estimating a position, e.g., an absolute location, a movement, or any other position-related attribute, of the mobile device, for example, based on distances between the mobile device and a plurality of location origins, e.g., by trilateration.

Another location estimation method may be performed by a mobile device by measuring wave propagation parameters, e.g., a Time of Arrival (TOA), of signals received from two or more location sources, e.g., two APs; and estimating the location of the mobile device based on measurements and known locations of the location sources, e.g., using a hyperbolic positioning location estimation calculation. This location estimation method may be beneficial, e.g., since it may enable the location estimation without requiring the mobile device to engage in direct communication with the location sources.

The location estimation methods may not provide location estimation with a desired accuracy, for example, if one or more parameters provided by the location sources do not have a desired availability and/or accuracy.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

FIG. 6 is a schematic illustration of a product of manufacture, in accordance with some demonstrative embodiments.

DETAILED DESCRIPTION

Figure 1:
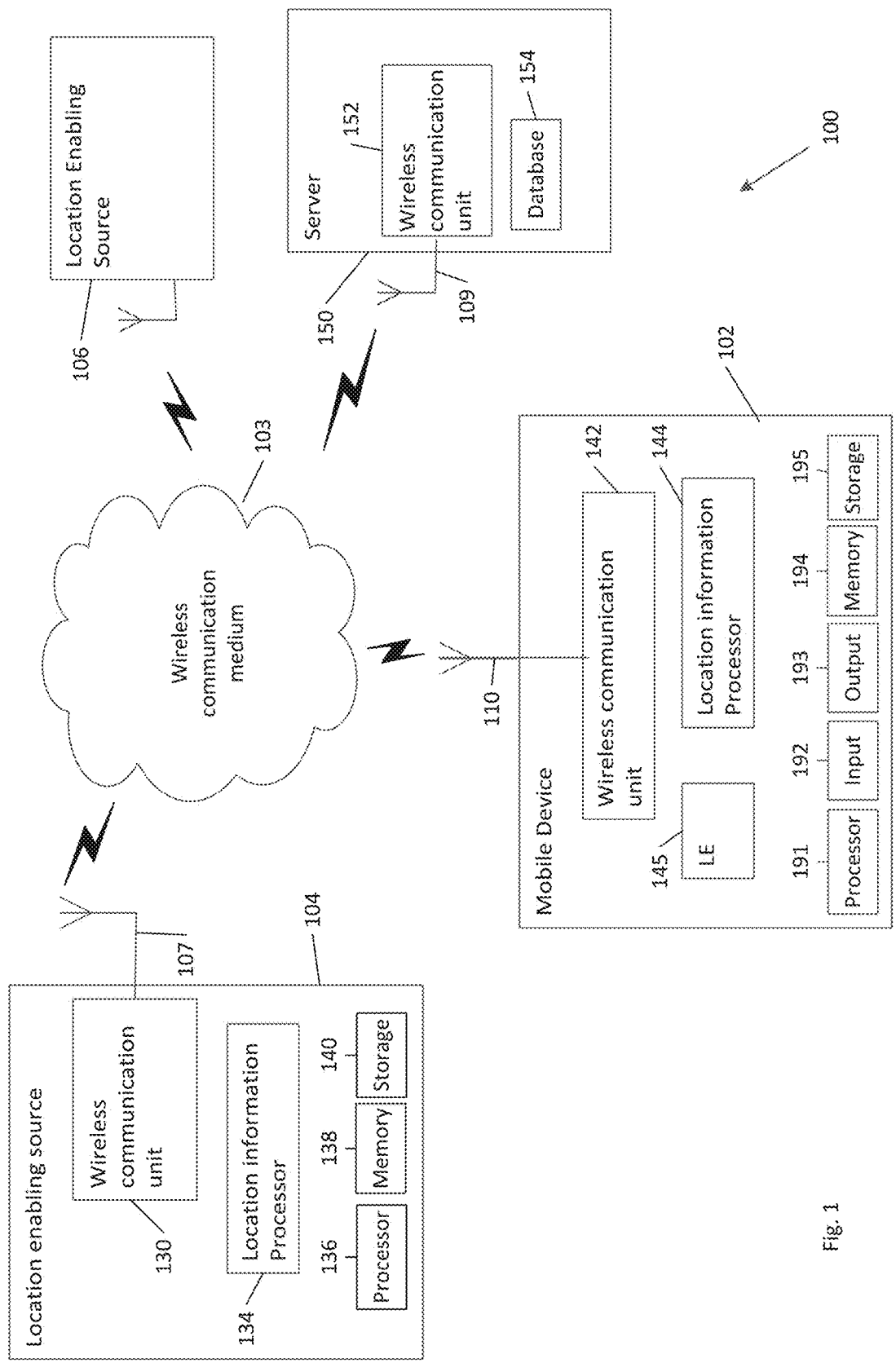
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless communication node, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2102; IEEE802.11 task group ac (TGac) ("*IEEE802.11-09/0308r12—TGac Channel Model Addendum Document*"); IEEE 802.11 task group ad (TGad) (*IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*); IEEE 802.11-REVmc (*IEEE P802.11-REVmc/D1.2—Telecommunications and information exchange between systems, Local and metropolitan area networks—Specific requirements, Part 11: Wireless LAN Medium Access Control (MAC) and Physical Layer (PHY) Specifications*, April 2013)) and/or future versions and/or derivatives thereof, devices and/or networks operating in accordance with existing Wireless-Gigabit-Affiance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.3, 2012*) and/or future versions and/or derivatives thereof, devices and/or networks operating in accordance with existing cellular specifications and/or protocols, e.g., $3^{rd}$ Generation Partnership Project (3GPP), 3GPP Long Term Evolution (LTE), and/or future versions and/or derivatives thereof, devices and/or networks operating in accordance with existing Open Mobile Alliance (OMA) standards, including the Secure User Plane Location (SUPL) protocol (*SUPL-OMA-AD-SUPL-V2.0 5.3.1.8*), the Mobile Location Protocol (MLP) (*OMA-TS-MLP v 3.3*, March 2009) and/or future versions and/or derivatives thereof, devices and/or networks operating in accordance with existing In Location Alliance protocols and/or standards and/or future versions and/or derivatives thereof, devices and/or networks operating in accordance with existing World-Wide-Web Consortium (W3C) standards, including the *W3C Hypertext Markup Language (HTML) Version 5*, October 2010 and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a Global Navigation Satellite System (GNSS) receiver or transceiver or chip, a device which incorporates an REID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RE), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating", as used herein with respect to a wireless communication signal includes transmitting the wireless communication signal and/or receiving the wireless communication signal. For example, a transceiver, which is capable of communicating a wireless communication signal, may include a wireless transmitter to transmit the wireless communication signal to at least one wireless communication device, and/or a wireless communication receiver to receive the wireless communication signal from at least one wireless communication device. The signal may be communicated as part of a unidirectional communication or as part of a bidirectional communication.

Some demonstrative embodiments may be used in conjunction with a WLAN. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz, 5 GHz, and the like. However, other embodiments may be implemented utilizing any other suitable wireless communication frequency bands, for example, a WLAN frequency band, a WPAN frequency band, a frequency band according to the WGA specification, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements.

The antenna may include, for example, a phased array antenna, a single element antenna, a set of switched beam antennas, and/or the like.

Reference is now made to FIG. 1, which schematically illustrates a block diagram of a wireless communication system 100, in accordance with some demonstrative embodiments.

In some demonstrative embodiments, system 100 may include a wireless communication device 102 capable of communicating content, data, information and/or signals over one or more wireless communication mediums (WMs) 103.

In some demonstrative embodiments, wireless communication mediums 103 may include for example, a Radio Frequency (RF) channel, a mmWave channel, a WiFi channel, a Bluetooth channel, a cellular channel, a Global Navigation Satellite System (GNSS) Channel, a Near Field Communication (NFC) channel, a Frequency Modulation (FM) channel, and the like.

In some demonstrative embodiments, device 102 may include, or may be included as part of, a mobile or portable device, for example, a mobile computer, a laptop computer, a notebook computer, a tablet computer, a handheld computer, an Ultrabook™, a handheld device, a PDA device, a handheld PDA device, an on-board device, an off-board device, a hybrid device (e.g., combining cellular phone functionalities with PDA device functionalities), a consumer device, an Ultrabook™, a vehicular device, a non-vehicular device, a cellular telephone, a PCS device, a PDA device which incorporates a wireless communication device, a mobile or portable GPS device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a BD player, a BD recorder, a DVD player, a HD DVD player, a DVD recorder, a HD DVD recorder, a PVR, a broadcast HD receiver, a video sink, an audio sink, a stereo tuner, a broadcast radio receiver, a flat panel display, a PMP, a DVC, a digital audio player, a gaming device, a data source, a data sink, a DSC, a media player, a Smartphone, a television, a music player, or the like.

In some demonstrative embodiments, device 102 may be located in a location area, e.g., an indoor location area, e.g., a building, an office, a mall, an airport, and the like. However, in other embodiments device 102 may be located in any other location area, for example, an outdoor location area, e.g., a vehicle, a street, a neighborhood, and the like.

In some demonstrative embodiments, system 100 may include at least one Location estimation Entity, also referred to as "location engine", (LE) 145 configured to estimate the location of device 102 in the location area based on location-enabling information (LEI) received from one or more location-enabling sources, e.g., including location-enabling sources (LESs) 104 and/or 106, as described below. In one example, LE 145 may utilize a combination of information received from one or more sources, for example, from one or more accelerometers of device 102, and/or one or more elements of system 100, e.g., to increase an accuracy level of the estimated location of device 102.

In some demonstrative embodiments, LE 145 may be implemented as part of device 102, e.g., as shown in FIG. 1. In other embodiments, LE 145 may be implemented as part of another element of system 100, e.g., as part of a location estimation server, a service-providing server, and the like.

In some demonstrative embodiments, the phrase "location-enabling information" as used herein may include information, which may be configured to be used for, and/or to support, assist, facilitate, allow, help and/or enable, estimating one or more position-related parameters, e.g., a position fix (FIX), a position-velocity-time (PVT) and/or the like, representing a position of a mobile device, for example, a location of the mobile device, e.g., a relative location of the mobile device and/or an absolute location of the mobile device, a movement of the mobile device, and/or any other position-related attribute of the mobile device.

In some demonstrative embodiments, the "location estimation entity" as used herein may include any entity configured to estimate the location of the mobile device and/or the one or more position-related parameters of the mobile device, based on received LEI.

In some demonstrative embodiments, system 100 may include a server 150 to manage the LEI to be provided to mobile device 102 by LESs 104 and/or 106, e.g., as described below.

In some demonstrative embodiments, device 102 may include at least one wireless communication unit 142, e.g., including one or more transceivers, configured to communicate wireless communication signals via one or more antennas 110. LESs 104 and/or 106 may include at least one wireless communication unit 130, e.g., including one or more transceivers, configured to communicate wireless communication signals via one or more antennas 107.

In some demonstrative embodiments, server 150 may be configured to communicate directly with one or more elements of system 100, e.g., with device 102 and/or LESs 104 and/or 106, via wireless medium 103. For example, server 150 may include a wireless communication unit 152, e.g., including one or more transceivers, configured to communicate wireless communication signals via one or more antennas 109.

In other embodiments, server 150 may communicate with one or more elements of system 100, e.g., with device 102 and/or LESs 104 and/or 106, via any other communication medium and/or interface, for example, server 150 may communicate with device 102 and/or LESs 104 and/or 106 over an Internet-Protocol (IP) layer or any other layer or interface, which may include a direct link, an indirect link, a wired link, a wireless link and/or any combination thereof.

In some demonstrative embodiments, antennas 110, 107 and/or 109 may include any type of antennas suitable for transmitting and/or receiving wireless communication signals, blocks, frames, transmission streams, packets, messages and/or data. Types of antennas that may be used for antennas 110, 107 and/or 109 may include but are not limited to internal antenna, dipole antenna, omni-directional antenna, a monopole antenna, an end fed antenna, a circularly polarized antenna, a micro-strip antenna, a diversity antenna, a phase array antenna and the like. In some embodiments, antennas 110, 107 and/or 109 may implement transmit and receive functionalities using separate transmit and receive antenna elements. In some embodiments, antennas 110, 107 and/or 109 may implement transmit and receive functionalities using common and/or integrated transmit/receive elements.

In some demonstrative embodiments, wireless communication unit 142 may be configured to communicate with LES 104 and/or 106, for example, to receive signals transmitted by LES 104 and/or 106, e.g., as described below.

The phrase "location enabling sources" as used herein may include any one or more sources, e.g., devices and/or modules, configured to provide LEI, e.g., to communicate, broadcast and/or transmit the LEI, in a format which may be receivable by device 102.

In some demonstrative embodiments, wireless communication units 142, 130 and/or 152 may include one or more WiFi transceivers, one or more Bluetooth (BT) transceivers, one or more cellular transceivers, e.g., a second generation cellular (2G) transceiver, a third generation cellular (3G) transceiver, a Universal Mobile Telecommunication System (UMTS) transceiver, a Long Term Evolution (LTE) transceiver, one or more NEC transceivers, one or more GNSS transceivers, and/or one or more digital radio (DR) transceivers, and/or the like. In some demonstrative embodiments, wireless communication units 142, 130 and/or 152 may include any other transceiver.

In some demonstrative embodiments, LES 104 and/or LES 106 may include one or more WiFi hotspots or APs, one or more cellular source transmitters, e.g., cellular base stations, cellular operators, cellular antennas and the like, one or more digital radio stations, one or more BT devices, one or more NEC devices, and/or the like.

In some demonstrative embodiments, mobile device 102, LES 104, LES 106 and/or server 150 may also include, for example, a processor 191, an input unit 192, an output unit 193, a memory unit 194, and a storage unit 195. Mobile device 102, LES 104, LES 106 and/or server 150 may optionally include other suitable hardware components and/or software components. In some demonstrative embodiments, some or all of the components of LES 104, LES 106 and/or server 150 may be enclosed in a common housing or packaging, and may be interconnected or operably associated using one or more wired or wireless links in other embodiments, components of LES 104, LES 106 and/or server 150 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. For example, processor 191 executes instructions, for example, of an Operating System (OS) of mobile device 102 and/or of one or more suitable applications.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 include, for example, a hard disk drive, a floppy disk drive, a Compact Disk (CD) drive, a CD-ROM drive, a DVD drive, or other suitable removable or non-removable storage units. For example, memory unit 194 and/or storage unit 195, for example, may store data processed by mobile device 102.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Cathode Ray Tube (CRT) display unit, a Liquid Crystal Display (LCD) display unit, a plasma display unit, one or more audio speakers or earphones, or other suitable output devices.

In some demonstrative embodiments, LES 104 and/or LES 106 may include a processor (also referred to as "location information processor") 134 to process LEI communicated by LES 104 and/or LES 106, and/or device 102 may include a location information processor 144 to process LEI communicated by device 102, e.g., as described below.

In some demonstrative embodiments, location information processor 144 may be implemented as part of LE 145 or as wireless communication unit 142. In other embodiments, location information processor 144, wireless communication unit 142 and/or LE 145 may be implemented as separate elements.

In some demonstrative embodiments, the LEI may include information, which may be configured to be used for, and/or to support, assist, facilitate, allow, help and/or enable, estimation of a curve of equal time difference with respect to a pair of LESs, e.g., including LESs 104 and/or 106.

In some demonstrative embodiments, LESs 104 and 106 may be configured to communicate LEI in a way, which may enable a mobile device, e.g., mobile device 102, to receive the LEI communicated by LESs 104 and 106, and may enable estimation of the location of the mobile device based on the LEI received by the mobile device, e.g., as described below.

In some demonstrative embodiments, processor 144 may measure wave propagation parameters, e.g., a Time of Arrival (TOA), of LEI signals received from LESs 104 and 106, e.g., as described below. Location estimator 145 may estimate the location of mobile device 102, for example, based on the measurements of the LEI signals and known locations of LESs 104 and 106, e.g., using a hyperbolic positioning location estimation calculation. This location estimation method may be beneficial, e.g., since it may enable the estimation of the location of mobile device 102 without requiring mobile device 102 to engage in direct communication with LESs 104 and/or 106.

Figure 2:
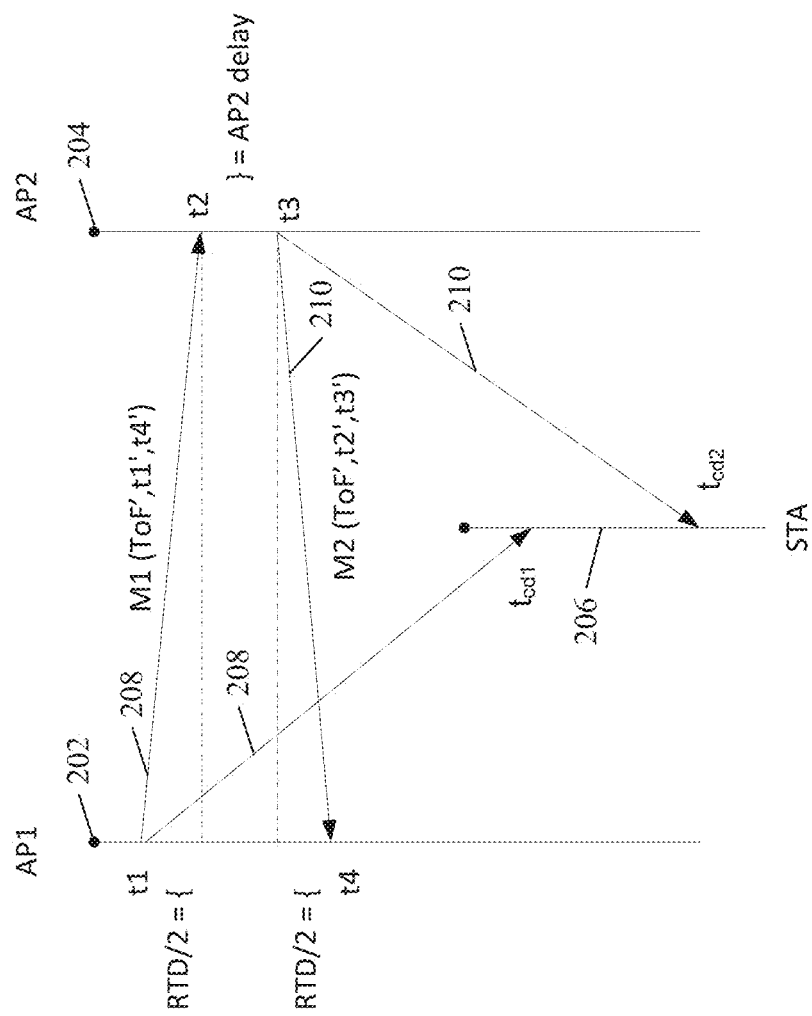
FIG. 2 is a schematic illustration of a sequence diagram, which demonstrates operations and interactions of a positioning measurement by a mobile device based on communications received from first and second devices, in accordance with some demonstrative embodiments.

FIG. 2 is a schematic illustration of a sequence diagram, which demonstrates operations and interactions of a positioning measurement by a mobile device 206, e.g., a station (STA), based on communications received from a first device 202, e.g., an AP, denoted AP1, and a second device 204, e.g., an AP, denoted AP2, in accordance with some demonstrative embodiments. For example, mobile device 206 may perform the functionality of mobile device 102 (FIG. 1), device 202 may perform the functionality of LES 104 (FIG. 1) and/or device 204 may perform the functionality of LES 106 (FIG. 1).

In some demonstrative embodiments, devices 202 and 204 may be configured to communicate one or more messages, which may be receivable by mobile device 206. For example, device 202 may transmit a message 208, denoted M1, and device 204 may transmit a message 210, denoted M2, e.g., in response to the message M1.

In some demonstrative embodiments, the device 202 may transmit the message 208 at a time, denoted t1, e.g., in an unassociated manner. The time t1 may be a Time of Departure (ToD), denoted ToD(M1), of the message M1, e.g., a local time at device 202 at a start of a transmission of the message M1 at an antenna port of device 202.

In some demonstrative embodiments, device 204 may receive the message 208 and determine a time, denoted t2, e.g., by determining a Time of Arrival (ToA), denoted ToA (M1), of the message M1 at device 204, e.g., a local time at device 204 at a start of a reception of the message M1 at an antenna port of device 204.

In some demonstrative embodiments, device 204 may transmit message 210 at a time, denoted t3. The time t3 may be a ToD, denoted ToD(M2), of the message M2, e.g., a local time at device 204 at a start of a transmission of the message M2 at an antenna port of device 204.

In some demonstrative embodiments, device 202 may receive the message 210 and determine a time, denoted t4, e.g., by determining a ToA, denoted ToA(M2), of the message M2 at device 202, e.g., a local time at device 202 at a start of a reception of the message M2 at an antenna port of device 202.

In some demonstrative embodiments, mobile device 206 may receive messages 208 and 210. For example, mobile device 206 may receive the message 208 and determine a time, denoted $t_{cd1}$, e.g., by determining a ToA of the message M1 at mobile device 206, e.g., a local time at mobile device 206 at a start of reception of the message M1 at an antenna port of mobile device 206. Mobile device 206 may receive the message 210 and determine a time, denoted $t_{cd2}$, e.g., by determining a ToA of the message M2 at mobile device 206, e.g., a local time at mobile device 206 at a start of reception of the message M2 at an antenna port of mobile device 206.

In some demonstrative embodiments, a relative Time Difference, denoted RTDiff, between mobile device 206 and devices 202 and 202 may be based on the times t1, t2, t3, $t_{cd1}$ and/or $t_{cd2}$. For example, the relative time difference RTDiff may be determined as follows:

$$RTDiff = (t_{cd1} - (t_{cd2} - AP2_{Delay})) \quad (1)$$

wherein C denotes the speed of light, and $AP2_{Delay}$ denotes a time delay between reception of the message M1 at device 204 and transmission of the message M2 from device 204.

In some demonstrative embodiments, the delay $AP2_{Delay}$ may be expressed in terms of the times t1 and t4 and the Tiff measured between devices 202 and 204. For example, the delay $AP2_{Delay}$ may be determined as follows:

$$AP2_{Delay} = t3 - t2 = (t4 - t1 - 2*TOF) \quad (2)$$

wherein TOF denotes a TOF measured by devices 202 and 204, for example, half of the Round Trip Delay (RTD) measured based on the communication of the messages M1 and M2 between device 202 and 204, e.g.:

$$TOF = RTD/2 \quad (3)$$

In some demonstrative embodiments, the relative time difference RTDiff may be determined as follows, e.g., by substituting Equation 2 into Equation 1:

$$RTDiff(t_{cd1} - (t_{cd2} - (t4 - t1 - TOF)) \quad (4)$$

In some demonstrative embodiments, the delay $AP2_{Delay}$ may be expressed in terms of the times t3 and t2, e.g., as follows:

$$AP2_{Delay} = (t3 - t2) \quad (5)$$

In some demonstrative embodiments, the relative time difference RTDiff may be determined as follows, e.g., by substituting Equation 5 into Equation 1:

$$RTDiff = (t_{cd1} - (t_{cd2} - (t3 - t2))) \quad (6)$$

In some demonstrative embodiments, knowledge of the delay $AP2_{Delay}$ and/or the parameters representing the delay $AP2_{Delay}$ may be required, e.g., in order to determine the relative time difference RTDiff.

For example, knowledge of the delay $AP2_{Delay}$ may be required, e.g., in order to determine the relative time difference RTDiff based on the times $t_{cd1}$ and/or $t_{cd2}$ in accordance with Equation 1; knowledge of the values of t4, t1 and TOF may be required, e.g., in order to determine the relative time difference RTDiff based on the times $t_{cd1}$ and/or $t_{cd2}$ in accordance with Equation 4; and/or knowledge of the values of t2 and t3 may be required, e.g., in order to determine the relative time difference RTDiff based on the times $t_{cd1}$ and/or $t_{cd2}$ in accordance with Equation 6.

In some demonstrative embodiments, devices 202 and/or 204 may be configured to transmit location-enabling information representing the values of t1, t2, t3, t4, TOF and/or $AP2_{Delay}$, e.g., as described below.

In some demonstrative embodiments, device 202 may transmit a value of a ToD, denoted t1', of a previous message, denoted M1', transmitted by device 202, a value of a ToA, denoted t4', of a previous message, denoted M2', received by device 202 from device 204, e.g., in response to the message M1', and/or the TOF, denoted TOF', measured by device 202 based on the messages M1' and M2'.

In some demonstrative embodiments, device 204 may transmit, for example, a value of a ToA, denoted t2', of the message M1' received by device 204 from device 202, a value of a ToD, denoted t3', of the message M2' transmitted by device 204 and/or the value of TOF' measured by device 204 based on the messages M1' and M2'.

In some demonstrative embodiments, device 202 may transmit the values of t1', t4' and TOF' as part of message M1, which may be transmitted by device 202 subsequent to the message M1'; and/or device 204 may transmit the values of t2', t3' and TOF' as part of message M2, which may be transmitted by device 202 subsequent to the message M2'.

In other embodiments, devices 202 and/or 204 may transmit the values of t1, t2, t3, t4, t4−t1, t3−t2, TOF and/or $AP2_{Delay}$, and/or any other value representing the delay $AP2_{Delay}$, as part of any other message, e.g., a dedicated message or a non-dedicated message.

Referring back to FIG. 1, in some demonstrative embodiments an LES, e.g., LES 104 and/or LES 106, may be configured to communicate a location-enabling message, in a form, which may be receivable by a mobile device, e.g., mobile device 102.

In some demonstrative embodiments, the location-enabling message may include a TOF message, e.g., a message communicated as part of a TOF measurement. For example, the location-enabling message may include a message communicated between a pair of LESs, e.g., the message M1 or M2 communicated by LESs 104 and 106. In other embodiments, the location-enabling message may include any other dedicated or non-dedicated message.

In some demonstrative embodiments, the location enabling message may include LEI configured for enabling estimation of a location of the mobile device, e.g., as described below.

In some demonstrative embodiments, the LEI may include information configured for enabling estimation of the location of the mobile device based on messages communicated between a pair of LESs, e.g., LESs 104 and 106, and received by the mobile device.

In some demonstrative embodiments, the LEI may include information configured for enabling estimation of the location of mobile device 102 based on the TOA at mobile device 102 of messages, e.g., messages M1 and M2, which are communicated between LESs 104 and 106.

In some demonstrative embodiments, LESs 104 and/or 106 may be configured to transmit location-enabling information representing the values of t1, t2, 13, t4, t4−t1, t3−t2, TOF, $AP2_{Delay}$ and/or any combination thereof, e.g., as described below.

In some demonstrative embodiments, the LEI information transmitted by LESs 104 and 106 may enable estimating, e.g., by LE 145, the relative time difference RTDiff of device 102 with respect to LESs 104 and 106, e.g., according to Equations 1, 4 and/or 6.

In some demonstrative embodiments, the location of device 102 may be estimated, e.g., by LE 145, based on a plurality of relative distances between mobile device 102 and a plurality of pairs of LESs, e.g., by trilateration of the plurality of relative distances.

In some demonstrative embodiments, LESs 104 and/or 106 may be configured to communicate the LEI in a configuration, which may selectively enable the use of the LEI by different users and/or mobile devices, e.g., as described in detail below.

In some demonstrative embodiments, LESs 104 and/or 106 may be configured to communicate the LEI in a configuration, which may enable one or more selected mobile devices, e.g., mobile device 102, to use the LEI, and to disable one or more other mobile devices from using the LEI, e.g., as described below.

In some demonstrative embodiments, LESs 104 and/or 106 may be configured to communicate the LEI in a configuration, which may enable providing the LEI at different accuracy levels, e.g., to provide to one or more first mobile devices the LEI at a first accuracy level, and to provide to one or more second mobile devices the LEI at a second accuracy level, different from the first accuracy level.

In some demonstrative embodiments, system 100 may be configured to enable differentiation of the LEI provided by a LES, e.g., LESs 104 and/or 106, to a device, e.g., mobile device 102, based on predefined differentiation criteria, e.g., as described below.

In some demonstrative embodiments, system 100 may be configured to differentiate an availability and/or accuracy level of the LEI provided by the LES to the mobile device, e.g., as described below.

In some demonstrative embodiments, the availability and/or accuracy level of the LEI may be differentiated based on one or more attributes relating to mobile device 102, one or more attributes relating to a user of mobile device 102, a location of mobile device 102, one or more attributes of LESs 104 and/or 106, one or more agreements between the user of mobile device 102 and a service provider, e.g., a service provider controlling LESs 104 and/or 106, and/or any other differentiation criteria.

In some demonstrative embodiments, the availability and/or accuracy level of the LEI provided to a mobile device may depend, for example, on whether or not a user of the mobile device had agreed to provide and/or share information relating to the estimated location of the mobile device.

For example, a first user of a first mobile device may agree to share with a service provider, e.g., a service provider controlling LES 104 and/or 106 or any other entity, location information relating to the first mobile device, e.g., by feeding back to the service provider information processed by processor 144 and/or LE 145. A second user of a second mobile device may not agree to share with the service provider location information relating to the second mobile device. For example, the service provider may utilize the location information relating to the first mobile device for analytics, targeted advertising, updating attributes of LESs 104 and/or 106, and the like.

According to this example, the service provider may control LESs 104 and/or 106 to provide the LEI in a form useable by the first mobile device and non-useable by the second device. Alternatively, the service provider may control LESs 104 and/or 106 to provide the LEI configured to provide a first accuracy level to the first mobile device and a second accuracy level, e.g., lesser than the first accuracy level, to the second mobile device.

In some demonstrative embodiments, the availability and/or accuracy level of the LEI provided to a mobile device may depend, for example, on whether or not the user of the mobile device enables one or more applications, e.g., running on device 102 or on another element of system 100, to receive and/or use information relating to the estimated location of the mobile device.

In some demonstrative embodiments, the availability and/or accuracy level of the LEI provided to a mobile device may depend, for example, on whether or not the user of the mobile device had subscribed to and/or paid for a service.

For example, a first user of a first mobile device may subscribe with a service provider controlling LES 104 and/or 106, e.g., by payment to the service provider and/or based on any agreement with the service provider. A second user of a second mobile device may not be subscribed to the service or may be subscribed to a lower service level, e.g., by payment of a reduced fee compared to the payment made by the first user.

According to this example, the service provider may control LESs 104 and/or 106 to provide the LEI in a form useable by the first mobile device and non-useable by the second device. Alternatively, the service provider may control LESs 104 and/or 106 to provide the LEI configured to provide a first accuracy level to the first mobile device and a second accuracy level, e.g., lesser than the first accuracy level, to the second mobile device.

In some demonstrative embodiments, the availability and/or accuracy level of the LEI provided to a mobile device may depend, for example, on whether or not the user of the mobile device is associated with the service provider, and/or based on any other criterion.

In some demonstrative embodiments, the selective availability and/or accuracy level of the LEI provided to the mobile device may be achieved, for example, by encrypting at least part of the LEI, e.g., as described below.

In some demonstrative embodiments, an LES, e.g., LES 104 and/or LES 106, may be configured to communicate the location-enabling message, in a form, which may be receivable by a mobile device, e.g., mobile device 102. The location enabling message may include encrypted LEI configured to enable estimation of a location of the mobile device at a predefined accuracy level based on a cryptographic key corresponding to the LES, e.g., as described below.

In some demonstrative embodiments, processor 134 may encrypt at least part of the LEI transmitted by LES 104, e.g., as described below.

In some demonstrative embodiments, the encrypted LEI may include any information enabling the estimation of a curve of equal time difference with respect to a pair of LESs, e.g., LESs 104 and 106.

In some demonstrative embodiments, the encrypted LEI may include the values of t1, t2, t3, t4, t4−t1, t3−t2, TOF, $AP2_{Delay}$ An/or any combination thereof.

In other embodiments, the encrypted LEI may include any other value enabling the estimation of the location of mobile device 102 based on one or more values, e.g., the times $t_{cd1}$ and/or $t_{cd2}$, measured with respect to messages transmitted by one or more LESs, e.g., the messages M1 and M2 communicated by LESs 104 and 106. For example, the LEI may include information relating to the location of LES 104 and/or 106 and/or any other parameter or value.

In some demonstrative embodiments, server 150 may manage the differentiation of the LEI to be provided to mobile device 102 by LESs 104 and/or 106, e.g., as described below.

In some demonstrative embodiments, server 150 may include a database 154 to maintain a plurality of cryptographic keys corresponding to LESs 104 and 106, e.g., as described below.

In some demonstrative embodiments, server 150 may selectively provide mobile device 102 with a cryptographic key corresponding to LESs 104 and 106, e.g., based on the differentiation criterion.

In one example, database 154 may store at least first and second cryptographic keys corresponding to LES 104 and/or LES 106. For example, the first cryptographic key may correspond to a first LEI accuracy level and the second cryptographic key may correspond to a second LEI accuracy level. Server 150 may provide the first cryptographic key to mobile device 102, e.g., if mobile device 102 is designated to use the LEI of the first accuracy level, or may provide the second cryptographic key to mobile device 102, e.g., if mobile device 102 is designated to use the LEI of the second accuracy level.

In some demonstrative embodiments, the cryptographic keys may include one or more master cryptographic keys corresponding to a group of two or more LESs, e.g., LESs 104 and 106. For example, a first master cryptographic key may correspond to the first LEI accuracy level and the second master cryptographic key may correspond to the second LEI accuracy level.

In some demonstrative embodiments, server 150 may provide to mobile device the master cryptographic key corresponding to the LEI accuracy level assigned to mobile device 102.

In some demonstrative embodiments, LES 104 may encrypt the LEI information transmitted by LES 104. For example, processor 134 may encrypt the LEI, which is communicated by wireless communication unit 130, according to at least one cryptographic key assigned to LES 104, e.g., as described below.

In some demonstrative embodiments, two or more LEI accuracy levels may be provided by selectively encrypting at least first and second portions of the LEI, e.g., as described below.

In some demonstrative embodiments, processor 134 may generate the location-enabling message including first LEI including encrypted LEI and second LEI.

For example, the first LEI may include information to enable estimating the location of mobile device 102 at a first accuracy level, and the second LEI may include information to enable estimating the location of mobile device 102 at a second accuracy, e.g., greater than the first accuracy level.

In some demonstrative embodiments, the first LEI may include a first portion of an LEI value and the second LEI may include a second portion of the LEI value. For example, the LEI value may include the value of t1, t2, t3, t4, t4−t1, t3−t2, TOF and/or $AP2_{Delay}$ and/or any other value representing the delay $AP2_{Delay}$ and/or any combination of the values t1, t2, t3, t4, t4−t1, t3−t2, TOF and/or $AP2_{Delay}$.

In some demonstrative embodiments, the first portion of the LEI value may include a Least-significant-bit (LSB) portion of the LEI value and the second LEI may include a Most-Significant-bit (MSB) portion of the LEI value.

In some demonstrative embodiments, a plurality of LEI accuracy levels may be provided using a plurality of portions of the LEI value.

For example, the LEI value may be represented by a predefined number, denoted X, of bits, denoted [X, (X−1), . . . , 0]. A first portion of the LEI value including a first predefined number, denoted Y1, of bits of the LEI value, e.g., including the bits [X, . . . , (X−Y1+1)], may be left unencrypted.

For example, a second portion of the LEI value including a second predefined number, denoted Y2, of bits of the LEI value, e.g., including the bits [(X−Y1), . . . , (X−Y1−Y2+1)], may be encrypted by a first key. A third portion of the LEI value including a third predefined number, denoted Y3, of bits of the LEI value, e.g., including the bits [(X−Y1−Y2), . . . , (X−Y1−Y2−Y3+1)], may be encrypted by a second key, and so on, e.g., until a portion of the LEI value including an N-th predefined number, denoted YN, of bits of the LEI value, e.g., including the bits [(X−Y1−Y2 . . . −Y(N−1)), . . . , 0] of the LEI value may be encrypted by an N-th key.

Accordingly, a first LEI accuracy level may be provided to mobile device 102, e.g., using the first LEI portion; a second LEI accuracy level may be provided to mobile device 102, e.g., using the first LEI portion and second LEI portions, for example, by providing the first encryption key to the mobile device; a third LEI accuracy level may be provided to mobile device 102, e.g., using the first, second and third LEI portions, for example, by providing the first and second encryption keys to the mobile device, and so on.

For example, the LEI value may include a 48-bit representation or any other representation, e.g., of the value of (t4−t1).

In one example, the LEI may be configured to either enable or disable use of the LEI. For example, the entire 48 bits of the LEI may be encrypted.

In another example, the LEI may be configured to provide two LEI accuracy levels.

In one example, e.g., if the 48-bit representation is used, each bit may provide an accuracy of 0.1 nanoseconds (nsec). Accordingly, each bit may enable an accuracy level of about 0.3 meter (m).

According to this example, the first LSB of the LEI may provide a first accuracy level, e.g., an accuracy of about 0.3 m, the second LSB of the LEI may provide a second accuracy level, e.g., an accuracy of about 1 m, the third and fourth LSBs of the LEI may provide a third accuracy level, e.g., an accuracy of about 3 m, and/or the fifth LSB of the LEI may provide a fourth accuracy level, e.g., an accuracy of about 10 m. In other embodiments, any other bits and/or sets of bits may be used to provide any other accuracy levels according to any other, linear, or non-linear, scales.

For example, a predefined number of MSBs of the LEI, e.g., the bits [47-4] of the LEI, may be left unencrypted, and the remaining bits of the LEI, e.g., bits [3-0], may be encrypted.

Alternatively, the bits [47-4] of the LEI may be encrypted using a first key, and the bits [3-0] of the LEI may be encrypted using a second key.

In another example, the LEI may be configured to provide three LEI accuracy levels. For example, a predefined number of MSBs of the LEI, e.g., the bits [47-5], may be left unencrypted, another portion of the LEI, e.g., bit [4], may be encrypted using a first key, and another portion of the LEI, e.g., bits [3-0], may be encrypted using a second key.

Alternatively, the bits [47-5] of the LEI may be encrypted using a first key, the bit [4] of the LEI may be encrypted using a second key, and the bits [3-0] of the LEI may be encrypted using a third key.

Alternatively, the bits [47-5] of the LEI may be encrypted using the first key, the bits [47-4] of the LEI, including the bits [47-5] already encrypted by the first key, may be encrypted using the second key, and the bits [4-0] of the LEI, including the bits [47-5] already encrypted by the first and second keys, may be encrypted using a third key.

In other embodiments, the LEI value may be divided into any other number of portions including any other number of bits, which may be encrypted using any other number, configuration and/or order of encryption keys. For example, the portions and/or the number of bits including in each portion may be defined based on an accuracy level corresponding to the bits, e.g., according to a linear or non-linear scale utilized for encoding the bits of the LEI.

In some demonstrative embodiments, processor 144 may receive the location-enabling message at mobile device 102, and may decrypt the encrypted LEI based on the cryptographic key corresponding to the LES from which the LEI was transmitted, e.g., as described below.

In some demonstrative embodiments, processor 144 may derive the cryptographic key corresponding to the LES based on an identifier of the LES and the master cryptographic key, e.g., as described below. For example, the identifier of the LES may include, for example, a Basic-Service-Set Identifier (BSSID) of the LES, a Media-Access-Control (MAC) address of the LES and/or any other identifier.

In some demonstrative embodiments, LE 145 may receive from processor 144 information corresponding to the LEI, and may estimate the location of mobile device 102 based on the LEI, e.g., according to Equations 1, 4 and/or 6 as described above.

In some demonstrative embodiments, a first LES, e.g., LES 104, may communicate with a second LES, e.g., LES 106, a first location-enabling message including first encrypted LEI representing a first time delay between the first and second LESs, and a second location-enabling message including second encrypted LEI representing a second time delay between the first and second LESs. The second time delay may be different from the first time delay.

In some demonstrative embodiments, an LES, e.g., LES 104 and/or LES 106, may change the value of the delay $AP2_{Delay}$, periodically, randomly and/or in any other manner.

Changing the value of the delay $AP2_{Delay}$ may enable better management of the LEI accuracy level provided to mobile device 102. For example, changing the value of the delay $AP2_{Delay}$ may enable providing different LEI accuracy levels to the same mobile device at different time instances. In one example, mobile device 102 may be allowed to receive a first LEI accuracy level, e.g., upon the user of device 102 agreeing to provide location information corresponding to mobile device or entering any other service agreement, e.g., as described above. The user of mobile device 102 may later be disabled from receiving the first LEI accuracy level, for example, if the user decides not to provide location information corresponding to mobile device or to cancel or modify the service agreement. According to this example, mobile device 102 may attempt using the previously provided value of the delay $AP2_{Delay}$ to perform location estimation calculations, e.g., even when prohibited from receiving the first LEI accuracy level. Changing the value of the delay $AP2_{Delay}$ may enable to ensure that the first LEI accuracy level is not provided to mobile device 102, e.g., when mobile device 102 is prohibited from receiving the first LEI accuracy level.

Figure 3:
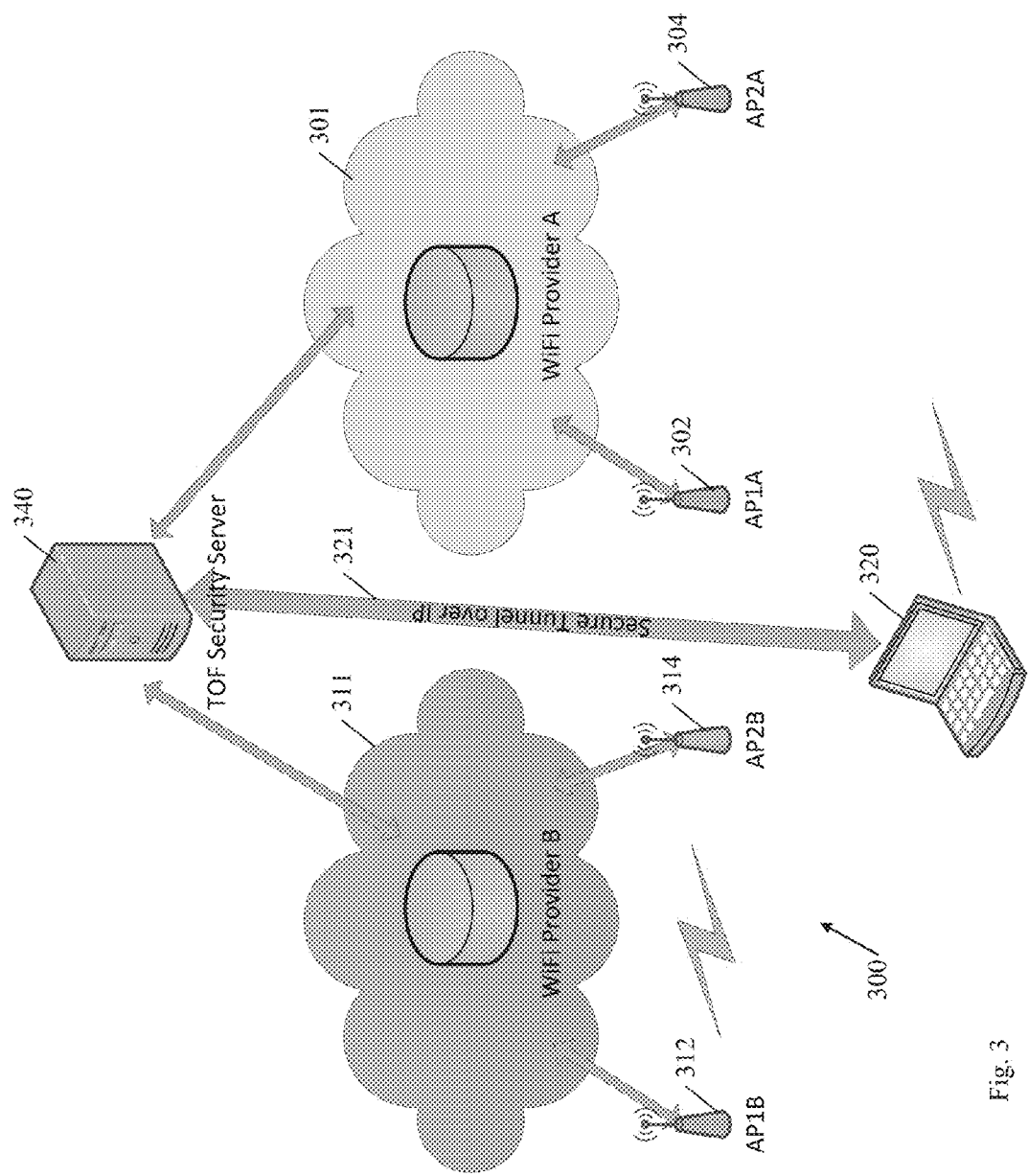
FIG. 3 is a schematic illustration of a system deployment, in accordance with some demonstrative embodiments.

Reference is made to FIG. 3, which schematically illustrates a system deployment 300, in accordance with some demonstrative embodiments.

In some demonstrative embodiments, system 300 may include a plurality of APs associated with a plurality of service providers. For example, as shown in FIG. 3, a first plurality of APs, including an AP 302, denoted AP1A, and an AP 304, denoted AP2A, may be associated with a first service provider 301, denoted WiFi provider A; and a second plurality of APs, including an AP 312, denoted AP1B, and an AP 314, denoted AP2B, may be associated with a second service provider 311, denoted WiFi provider B. For example, APs 302 and 304 may perform the functionality of LESs 104 and 106 (FIG. 1); and APs 312 and 304 may perform the functionality of another pair of LESs.

In some demonstrative embodiments, a TOF server 340 may be configured to manage the LEI to be provided to a mobile device 320. For example, server 340 may perform the functionality of server 150 (FIG. 1) and/or mobile device 320 may perform the functionality of mobile device 102 (FIG. 1).

In some demonstrative embodiments, server 340 may be implemented as part of a location server configured to provide location-based services to mobile device 320. In other embodiments, server 340 may be implemented as a dedicated server or as part of any other element of system 300.

In some demonstrative embodiments, server 340 may communicate with mobile device 320 over a secure communication link 321, for example, a secure tunnel over Internet Protocol (IP) link, a cellular link, or any other link.

In some demonstrative embodiments, a service provider may define one or more service levels to be provided by the APs managed by the service provider.

For example, service provider 301 may define first and second service levels to be provided by APs 302 and 304. In one example, the first service level may include providing LEI of a first accuracy level, e.g., only to mobile devices, which have subscribed to a first service plan with service provider 301; and/or the second service level may include providing LEI of a second accuracy level, e.g., greater than the first accuracy level, for example, only to mobile devices, which have subscribed to a second service plan with service provider 301.

According to this example, mobile devices, which have not subscribed with service provider 301, may not be able to use any LEI provided by APs 302 and 304. Alternatively, one of the service levels, e.g., the service level with the lowest accuracy level, may be designated for users, which have not subscribed with the service provider.

For example, service provider 311 may define first, second and third service levels to be provided by APs 312 and 314. In one example, the first service level may include providing LEI of a first accuracy level, e.g., only to mobile devices, which have subscribed to a first service plan with service provider 311; the second service level may include providing LEI of a second accuracy level, e.g., greater than the first accuracy level, for example, only to mobile devices, which have subscribed to a second service plan with service provider 311; and/or the third service level may include providing LEI of a third accuracy level, e.g., greater than the second accuracy level, for example, only to mobile devices, which have subscribed to a third service plan with service provider 311.

According to this example, mobile devices, which have not subscribed with service provider 311, may not be able to use any LEI provided by APs 312 and 314. Alternatively, one of the service levels, e.g., the service level with the lowest accuracy level, may be designated for users, which have not subscribed with the service provider.

In some demonstrative embodiments, mobile device 320 may be engaged in one or more service agreements with one or more service providers. For example, mobile device 320 may be engaged with service provider 301 according to a first Service Level Agreement (SLA), e.g., enabling mobile device 320 to receive the LEI of the second accuracy level from APs 302 and 304; and/or mobile device 320 may be engaged with service provider 311 according to a second SLA, e.g., enabling mobile device 320 to receive the LEI of the first accuracy level from APs 312 and 314.

In some demonstrative embodiments, server 340 may manage a plurality of group master keys for a plurality of group member stations (STA). For example, server 340 may manage two master keys corresponding to the first and second service levels of service provider 301. Server 340 may manage, for example, three master keys corresponding to the first, second and third service levels of service provider 311.

In some demonstrative embodiments, server 340 may manage a plurality of Group Master Keys corresponding to a group of APs, e.g., APS managed by a common service provider or any other group of APs.

For example, with respect to service provider 301, server 340 may manage a Group Master Key Low Accuracy, denoted $GMK_L$, corresponding to the first service level, and a Group Master Key High Accuracy, denoted $GMK_H$, corresponding to the second service level.

In some demonstrative embodiments, server 340 may manage and/or update the master keys based on lifetime, usage, group association, and/or any other attributes.

In some demonstrative embodiments, a STA, e.g., mobile device 320, may be associated with an account on server 340. For example, mobile device 320 may connect to server 340 via link 321, e.g., prior to performing a TOF measurement with a group of APs associated with a service provider, e.g., APs 302 and 304 or APs 312 and 314.

In some demonstrative embodiments, server 340 may provision mobile device 320 with one or more of the group keys corresponding to the group of APs, for example, based on a SLA between mobile device 320 and the service provider.

In some demonstrative embodiments, an AP may be provisioned with a derivative of the group master keys, for example, using a Key Derivative Function (KDF) corresponding to the AP, e.g., based on an identifier of the AP. For example, the AP may be identified by the BSSID of the AP, the MAC address of the AP, and the like.

In one example, an AP-specific Low Accuracy Key, denoted $APGK_L$, may be derived for the AP based on the group key $GMK_L$ and the identifier of the AP, denoted $AP_{ID}$, e.g., as follows:

$$APGK_L = KDF(GMK_L, AP_{ID}) \quad (7)$$

For example, the AP-specific Low Accuracy Key may be determined using the BSSID of the AP, e.g., as follows:

$$APGK_L = KDF(GMK_L, BSSID) \quad (8)$$

In one example, an AP-specific High Accuracy Key, denoted $APGK_H$, may be derived for the AP based on the group key $GMK_H$ and the identifier of the AP, e.g., as follows:

$$APGK_H = KDF(GMK_H, AP_{ID}) \quad (9)$$

For example, the AP-specific High Accuracy Key may be determined using the BSSID of the AP, e.g., as follows:

$$APGK_H = KDF(GMK_H, BSSID) \quad (10)$$

In some demonstrative embodiments, the KDF may apply one or more additional parameters and/or attributes to the calculation of the AP-specific keys, for example, a cryptographic NONCE, which may be included in the communication enabling message communicated by the AP, a counter value, e.g., to avoid or reduce the probability of a replay attack, a security server identifier, a padding a string, and the like.

In some demonstrative embodiments, an AP of system 300 may encrypt the LEI according to the AP-specific keys. For example, APs 302 and 304 may encrypt a high-accuracy portion of the LEI, e.g., the predefined number of LSBs ("high accuracy bits") of the LEI, using the key $APGK_H$. For example, APs 302 and 304 may encrypt the high accuracy portion using the Advanced-Encryption-Standard (AES) or any other encryption protocol. APs 302 and 304 may encrypt and authenticate the entire LEI, e.g., including the encrypted high accuracy bits, using the key $APGK_L$. For example, APs 302 and 304 may encrypt and authenticate the LEI using the AES Counter Cipher Mode with Block Chaining Message Authentication Code Protocol (CCMP) or any other encryption and/or authentication protocol.

In some demonstrative embodiments, server 340 may provide to mobile device 320 the group key $GMK_L$ corresponding to service provider 301, e.g., while not providing to mobile device 320 the group key $GMK_H$, for example, if mobile device 320 is engaged with service provider 301 according to the first SLA.

In some demonstrative embodiments, server 340 may provide to mobile device 320 both the group keys $GMK_L$ and $GMK_H$, corresponding to service provider 301, for example, if mobile device 320 is engaged with service provider 301 according to the second SLA.

In some demonstrative embodiments, mobile device 320 may receive location enabling messages, for example, TOF messages, from APs 302 and/or 304, e.g., the messages M1 and M2, as described above with reference to FIG. 2. The location-enabling messages may include the LEI information encrypted according to the AP-specific keys of APs 302 and 304, e.g., as described above.

In some demonstrative embodiments, mobile device 320 may derive one or more AP-specific keys corresponding to the AP from which the location-enabling message was received. For example, mobile device 320 may derive the one or more AP-specific keys based on the one or more group keys and the identifier of the AP, e.g., according to Equations 7, 8, 9 and/or 10.

In some demonstrative embodiments, mobile device 320 may decrypt the LEI using the derived AP-specific keys. For example, mobile device 320 may decrypt the low-accuracy bits of the LEI, e.g., if the group key $GMK_L$ is available to mobile device 320; and mobile device 320 may decrypt the high-accuracy bits of the LEI, e.g., if the group key $GMK_H$ is available to mobile device 320.

Figure 4:
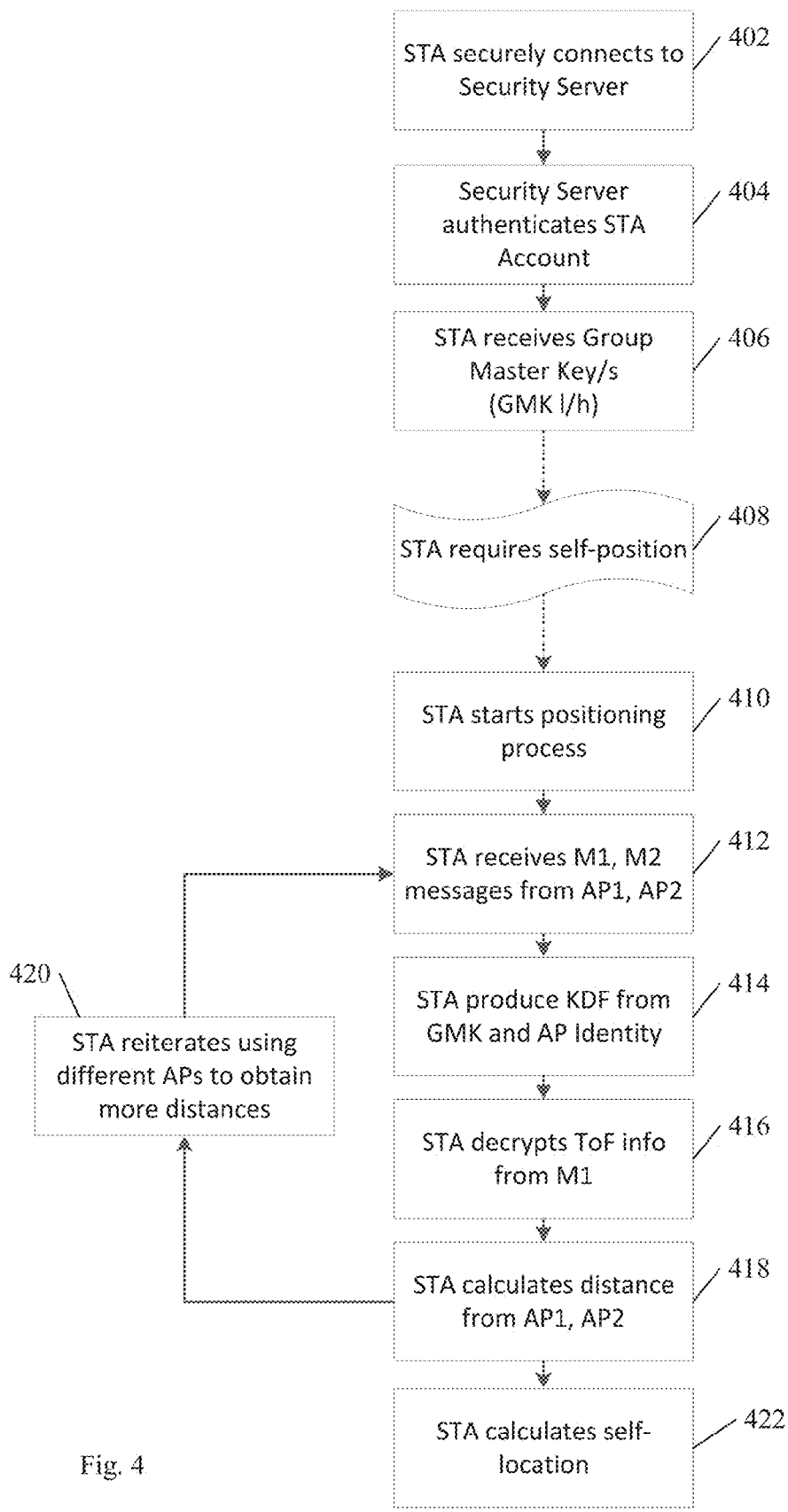
FIG. 4 is a schematic flow chart illustration of a method of estimating a location of a mobile device, in accordance with some demonstrative embodiments.

Reference is made to FIG. 4, which schematically illustrates a method of estimating a location of a mobile device, in accordance with some demonstrative embodiments. In some demonstrative embodiments, one or more of the operations of the method of FIG. 4 may be performed by one or more elements of a system, e.g., system 100 (FIG. 1) or system 300 (FIG. 3), a mobile device, e.g., mobile device 102 (FIG. 1) or mobile device 320 (FIG. 3), a processor, e.g., processor 144 (FIG. 1), and/or a location estimator, e.g., LE 145 (FIG. 1).

As indicated at block 402, the method may include connecting a station to a secure server, e.g., over a secure communication link. For example, mobile device 102 (FIG. 1) may connect to server 150 (FIG. 1), e.g., via link 321 (FIG. 1).

As indicated at block 404, the method may include authenticating the station with the server. For example, server 150 (FIG. 1) may authenticate mobile device 102 (FIG. 1) with respect to an account assigned to mobile device 102 (FIG. 1), e.g., using a username and password or any other information.

As indicated at block 406, the method may include receiving one or more group keys from the server. For example, mobile device 102 (FIG. 1) may receive from server 150 (FIG. 1) one or more group keys, e.g., including group keys $GMK_L$ and $GMK_H$ and/or any other group keys, e.g., as described above.

As indicated at blocks 408 and 410, the method may include initiating a location estimation process to estimate a location of the station. For example, processor 144 (FIG. 1) may receive from LE 145 (FIG. 1) or from an application running on mobile device 102 (FIG. 1) a request to perform a location estimation process.

As indicated at block 412, the method may include receiving location-enabling messages from a plurality of location enabling sources, e.g., a pair of LESs. For example, mobile device 102 (FIG. 1) may receive the messages M1 and M2 from LESs 104 and 106 (FIG. 1), e.g., as described above.

As indicated at block 414, the method may include deriving the AP-specific keys corresponding to the LESs. For example, processor 144 (FIG. 1) may derive the AP-specific keys $APGK_L$ and/or $APGK_H$, e.g., as described above.

As indicated at block 416, the method may include decrypting the LEI. For example, processor 144 (FIG. 1) may decrypt the LEI of one or more accuracy levels using the one or more AP-specific keys, e.g., as described above.

As indicated at block 418, the method may include determining a distance between the station and the plurality of LESs. For example, mobile device 102 (FIG. 1) may determine the relative distance to LESs 104 and 106 (FIG. 1) based on the decrypted LEI, e.g., as described above.

As indicated at block 420, the method may include determining one or more distances between the station and one or more other pluralities of LESs. For example, mobile device 102 (FIG. 1) may reiterate the calculation of the relative distance with respect to one or more additional pairs of APs, e.g., as described above.

As indicated at block 422, the method may include estimating the location of the station based on the calculated distances. For example, LE 145 (FIG. 1) may estimate the location of mobile device 102 (FIG. 1), for example, by trilateration of the calculated relative distances, e.g., as described above.

Figure 5:
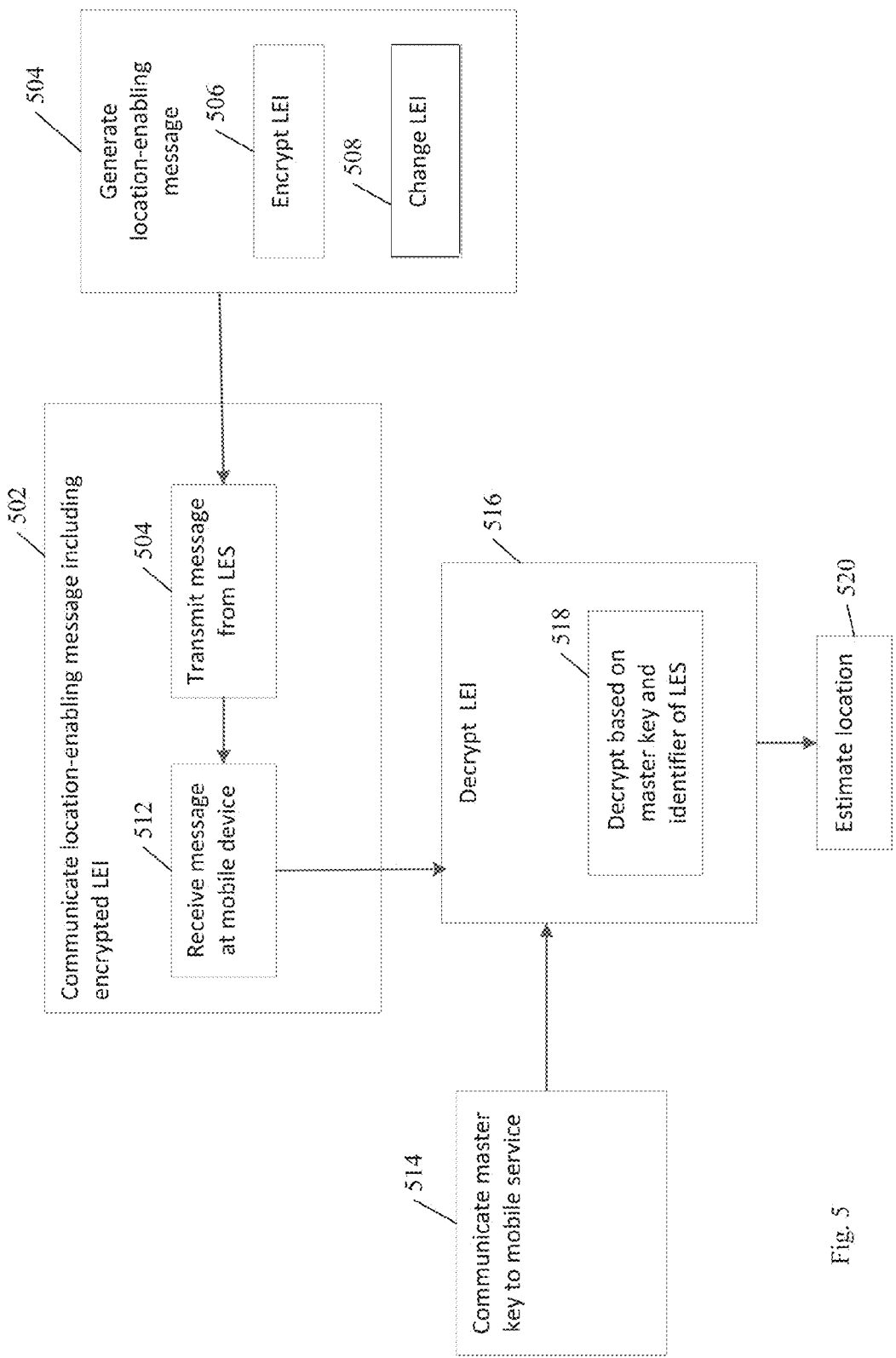
FIG. 5 is a schematic flow chart illustration of a method of communicating location-enabling information (LEI), in accordance with some demonstrative embodiments.

Reference is made to FIG. 5, which schematically illustrates a method of communicating LEI, in accordance with some demonstrative embodiments. In some demonstrative embodiments, one or more of the operations of the method of FIG. 5 may be performed by one or more elements of a system, e.g., system 100 (FIG. 1) or system 300 (FIG. 3), a mobile device, e.g., mobile device 102 (FIG. 1) or mobile device 320 (FIG. 3), a processor, e.g., processor 144 and/or processor 134 (FIG. 1), a location estimator, e.g., LE 145 (FIG. 1), a LES, e.g., LES 104 and/or 106 (FIG. 1), and/or a server, e.g., server 150 (FIG. 1) or server 340 (FIG. 1).

As indicated at block 502, the method may include communicating a location-enabling message including encrypted LEI. For example, the location-enabling message may include a message, which is transmitted between first and second LESs, e.g., LESs 104 and 106 (FIG. 1), and receivable by a mobile device, e.g., mobile device 102 (FIG. 1). The encrypted LEI may include, for example, LEI configured for enabling estimation of a location of the mobile device at a predefined accuracy based on a cryptographic key corresponding to the first LES, e.g., as described above.

As indicated at block 510, communicating the location-enabling message may include transmitting the location-enabling message from the first LES. For example, LES 104 (FIG. 1) may transmit the location-enabling message including the encrypted LEI, e.g., as described above.

As indicated at block 504, the method may include generating the location-enabling message. For example, LES 104 (FIG. 1) may generate the location-enabling message, e.g., as described above.

As indicated at block 506, generating the location-enabling message may include encrypting the LEI. For example, LES 104 (FIG. 1) may encrypt at least a portion of the LEI using at least one AP-specific key, e.g., as described above.

As indicated at block 508, generating the location-enabling message may include changing an LEI value. For example, LES 104 (FIG. 1) may communicate a first location-enabling message including first encrypted LEI representing a first time delay, and a second location-enabling message including second encrypted LEI representing a second time delay different from the first time delay, e.g., as described above.

As indicated at block 512, communicating the location-enabling message may include receiving the location-enabling message at a mobile device. For example, mobile device 102 (FIG. 1) may receive the location-enabling message transmitted by LES 104 (FIG. 1), e.g., as described above.

As indicated at block 516, the method may include decrypting the encrypted LEI. For example, mobile device 102 (FIG. 1) may decrypt the LEI transmitted by LES 104 (FIG. 1), e.g., as described above.

As indicated at block 518, decrypting the LEI may include decrypting the LEI using a master cryptographic key and an identifier of the LES. For example, mobile device 102 (FIG. 1) may decrypt the LEI based on a group master key corresponding to LES 104 (FIG. 1) and an identifier, e.g., a BSSID, of LES 104 (FIG. 1), e.g., as described above.

As indicated at block 514, the method may include communicating the master cryptographic key to the mobile device. For example, server 150 (FIG. 1) may provide the master cryptographic key to mobile device 102 (FIG. 1), e.g., as described above.

As indicated at block 520, the method may include estimating a location of the mobile device based on the LEI. For example, LE 145 (FIG. 1) may estimate the location of mobile device 102 (FIG. 1) using the LEI, e.g., as described above.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of a LES, e.g., LES 104 (FIG. 1) and/or LES 106 (FIG. 1), a mobile device, e.g., mobile device 102 (FIG. 1), a wireless communication unit, e.g., wireless communication unit 130 (FIG. 1), wireless communication unit 142 (FIG. 1), and/or wireless communication unit 152 (FIG. 1), a processor, e.g., processor 134 (FIG. 1) and/or processor 144 (FIG. 1), and/or a server, e.g., server 150 (FIG. 1), and/or to perform one or more operations of the methods of FIGS. 4 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R). Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus of wireless communication, the apparatus comprising a location-enabling information (LEI) processor to process a location-enabling message, which is transmitted between first and second location-enabling sources and receivable by a mobile device, the location-enabling message including encrypted LEI configured for enabling estimation of a location of the mobile device at a predefined accuracy based on a cryptographic key corresponding to the first location-enabling source.

Example 2 includes the subject matter of Example 1 and optionally, wherein the LEI processor is to receive the location-enabling message at the mobile device, and to decrypt the encrypted LEI based on the cryptographic key corresponding to the first location-enabling source.

Example 3 includes the subject matter of Example 2 and optionally, wherein the LEI processor is to derive the cryptographic key corresponding to the first location-enabling source based on an identifier of the first location-enabling source and a master cryptographic key.

Example 4 includes the subject matter of Example 3 and optionally, wherein the LEI processor is to receive the master cryptographic key from a server.

Example 5 includes the subject matter of any one of Examples 2-4 and optionally, wherein the LEI processor is to estimate the location of the device according to a hyperbolic positioning calculation based on a plurality of location enabling messages communicated between the first and second location-enabling sources.

Example 6 includes the subject matter of Example 1 and optionally, wherein the LEI processor is to generate the location-enabling message at the first location-enabling source.

Example 7 includes the subject matter of any one of Examples 1-6 and optionally, wherein the location-enabling message comprises first LEI including the encrypted LEI and second LEI, the first LEI to enable estimating the location of the mobile device at a first accuracy level and the second LEI to enable estimating the location of the mobile device at a second accuracy level, the first accuracy level is greater than the second accuracy level.

Example 8 includes the subject matter of Example 7 and optionally, wherein the first LEI includes a first portion of an LEI value and the second LEI includes a second portion of the LEI value.

Example 9 includes the subject matter of Example 8 and optionally, wherein the first portion of the LEI value includes a Least-significant-bit (LSB) portion of the LEI value and the second portion of the LEI includes a Most-Significant-bit (MSB) portion of the LEI value.

Example 10 includes the subject matter of any one of Examples 7-9 and optionally, wherein the first LEI is encrypted by a first cryptographic key and the second LEI is encrypted by a second cryptographic key.

Example 11 includes the subject matter of any one of Examples 1-10 and optionally, wherein the encrypted LEI comprises information enabling estimation of a curve of equal time difference with respect to the first and second location-enabling sources.

Example 12 includes the subject matter of any one of Examples 1-11 and optionally, wherein the encrypted LEI comprises information relating to a time delay between the first and second location-enabling sources.

Example 13 includes the subject matter of Example 12 and optionally, wherein the LEI processor is to communicate a first location-enabling message including first encrypted LEI representing a first time delay between the first and second location-enabling sources, and a second location-enabling message including second encrypted LEI representing a second time delay between the first and second location-enabling sources, the second time delay between the first and second location-enabling sources is different from the first time delay between the first and second location-enabling sources.

Example 14 includes the subject matter of Example 12 or 13 and optionally, wherein the encrypted LEI includes at least one value selected from the group consisting of a first time of transmission of a first message from the first location-enabling source to the second location-enabling source, a second time of reception of the first message at the second location-enabling source, a third time of transmission of a second message from the second location-enabling source to the first location-enabling source, a fourth time of reception of the second message at the first location-enabling source, a difference between the fourth and first times, a difference between the third and second times, and a time-of-flight between the first and second location-enabling sources.

Example 15 includes the subject matter of any one of Examples 1-14 and optionally, wherein the encrypted LEI comprises information relating to a location of the first location-enabling source.

Example 16 includes the subject matter of any one of Examples 1-15 wherein the location-enabling message comprises a Time of Flight (TOF) message.

Example 17 includes the subject matter of any one of Examples 1-16 and optionally, wherein the first and second location-enabling sources comprise first and second Access Points (APs).

Example 18 includes a wireless communication system comprising a wireless communication device including one or more antennas; at least one wireless communication unit to communicate a location-enabling message, which is transmitted between first and second location-enabling sources and receivable by a mobile device, the location-enabling message including encrypted location-enabling information (LEI) configured for enabling estimation of a location of the mobile device at a predefined accuracy based on a cryptographic key corresponding to the first location-enabling source; and a LEI processor to process the location-enabling message.

Example 19 includes the subject matter of Example 18 and optionally, wherein the LEI processor is to receive the location-enabling message at the mobile device, and to decrypt the encrypted LEI based on the cryptographic key corresponding to the first location-enabling source.

Example 20 includes the subject matter of Example 19 and optionally, wherein the LEI processor is to derive the cryptographic key corresponding to the first location-enabling source based on an identifier of the first location-enabling source and a master cryptographic key.

Example 21 includes the subject matter of Example 20 and optionally, wherein the LEI processor is to receive the master cryptographic key from a server.

Example 22 includes the subject matter of any one of Examples 19-21 and optionally, wherein the LEI processor is to estimate the location of the device according to a hyperbolic positioning calculation based on a plurality of location enabling messages communicated between the first and second location-enabling sources.

Example 23 includes the subject matter of Example 18 and optionally, wherein the LEI processor is to generate the location-enabling message at the first location-enabling source.

Example 24 includes the subject matter of any one of Examples 18-23 and optionally, wherein the location-enabling message comprises first LEI including the encrypted LEI and second LEI, the first LEI to enable estimating the location of the mobile device at a first accuracy level and the second LEI to enable estimating the location of the mobile device at a second accuracy level, the first accuracy level is greater than the second accuracy level.

Example 25 includes the subject matter of Example 24 and optionally, wherein the first LEI includes a first portion of an LEI value and the second LEI includes a second portion of the LEI value.

Example 26 includes the subject matter of Example 25 and optionally, wherein the first portion of the LEI value includes a Least-significant-bit (LSB) portion of the LEI value and the second portion of the LEI includes a Most-Significant-bit (MSB) portion of the LEI value.

Example 27 includes the subject matter of any one of Examples 24-26 and optionally, wherein the first LEI is encrypted by a first cryptographic key and the second LEI is encrypted by a second cryptographic key.

Example 28 includes the subject matter of any one of Examples 18-27 and optionally, wherein the encrypted LEI comprises information enabling estimation of a curve of equal time difference with respect to the first and second location-enabling sources.

Example 29 includes the subject matter of any one of Examples 18-28 and optionally, wherein the encrypted LEI comprises information relating to a time delay between the first and second location-enabling sources.

Example 30 includes the subject matter of Example 29 and optionally, wherein the wireless communication unit is to communicate a first location-enabling message including first encrypted LEI representing a first time delay between the first and second location-enabling sources, and a second location-enabling message including second encrypted LEI representing a second time delay between the first and second location-enabling sources, the second time delay between the first and second location-enabling sources is different from the first time delay between the first and second location-enabling sources.

Example 31 includes the subject matter of Example 29 or 30 and optionally, wherein the encrypted LEI includes at least one value selected from the group consisting of a first time of transmission of a first message from the first location-enabling source to the second location-enabling source, a second time of reception of the first message at the second location-enabling source, a third time of transmission of a second message from the second location-enabling source to the first location-enabling source, a fourth time of reception of the second message at the first location-enabling source, a difference between the fourth and first times, a difference between the third and second times, and a time-of-flight between the first and second location-enabling sources.

Example 32 includes the subject matter of any one of Examples 18-31 and optionally, wherein the encrypted LEI comprises information relating to a location of the first location-enabling source.

Example 33 includes the subject matter of any one of Examples 18-32 wherein the location-enabling message comprises a Time of Flight (TOF) message.

Example 34 includes the subject matter of any one of Examples 18-33 and optionally, wherein the first and second location-enabling sources comprise first and second Access Points (APs).

Example 35 includes a method of wireless communication, the method comprising communicating a location-enabling message, which is transmitted between first and second location-enabling sources and receivable by a mobile device, the location-enabling message including encrypted location-enabling information (LEI) configured for enabling estimation of a location of the mobile device at a predefined accuracy based on a cryptographic key corresponding to the first location-enabling source.

Example 36 includes the subject matter of Example 35, and optionally comprising receiving the location-enabling message at the mobile device, and decrypting the encrypted LEI based on the cryptographic key corresponding to the first location-enabling source.

Example 37 includes the subject matter of Example 36, and optionally comprising deriving the cryptographic key corresponding to the first location-enabling source based on an identifier of the first location-enabling source and a master cryptographic key.

Example 38 includes the subject matter of Example 37, and optionally comprising receiving the master cryptographic key from a server.

Example 39 includes the subject matter of any one of Examples 36-38, and optionally comprising estimating the location of the device according to a hyperbolic positioning calculation based on a plurality of location enabling messages communicated between the first and second location-enabling sources.

Example 40 includes the subject matter of Example 35, and optionally comprising generating the location-enabling message at the first location-enabling source.

Example 41 includes the subject matter of any one of Examples 35-40 and optionally, wherein the location-enabling message comprises first LEI including the encrypted LEI and second LEI, the first LEI to enable estimating the location of the mobile device at a first accuracy level and the second LEI to enable estimating the location of the mobile device at a second accuracy level, the first accuracy level is greater than the second accuracy level.

Example 42 includes the subject matter of Example 41 and optionally, wherein the first LEI includes a first portion of an LEI value and the second LEI includes a second portion of the LEI value.

Example 43 includes the subject matter of Example 42 and optionally, wherein the first portion of the LEI value includes a Least-significant-bit (LSB) portion of the LEI value and the second portion of the LEI includes a Most-Significant-bit (MSB) portion of the LEI value.

Example 44 includes the subject matter of any one of Examples 41-43 and optionally, wherein the first LEI is encrypted by a first cryptographic key and the second LEI is encrypted by a second cryptographic key.

Example 45 includes the subject matter of any one of Examples 35-44 and optionally, wherein the encrypted LEI comprises information enabling estimation of a curve of equal time difference with respect to the first and second location-enabling sources.

Example 46 includes the subject matter of any one of Examples 35-45 and optionally, wherein the encrypted LEI comprises information relating to a time delay between the first and second location-enabling sources.

Example 47 includes the subject matter of Example 46, and optionally comprising communicating a first location-enabling message including first encrypted LEI representing a first time delay between the first and second location-enabling sources, and a second location-enabling message including second encrypted LEI representing a second time delay between the first and second location-enabling sources, the second time delay between the first and second location-enabling sources is different from the first time delay between the first and second location-enabling sources.

Example 48 includes the subject matter of Example 46 or 47 and optionally, wherein the encrypted LEI includes at least one value selected from the group consisting of a first time of transmission of a first message from the first location-enabling source to the second location-enabling source, a second time of reception of the first message at the second location-enabling source, a third time of transmission of a second message from the second location-enabling source to the first location-enabling source, a fourth time of reception of the second message at the first location-enabling source, a difference between the fourth and first times, a difference between the third and second times, and a time-of-flight between the first and second location-enabling sources.

Example 49 includes the subject matter of any one of Examples 35-48 and optionally, wherein the encrypted LEI comprises information relating to a location of the first location-enabling source.

Example 50 includes the subject matter of any one of Examples 35-49 wherein the location-enabling message comprises a Time of Flight (TOF) message.

Example 51 includes the subject matter of any one of Examples 35-50 and optionally, wherein the first and second location-enabling sources comprise first and second Access Points (APs).

Example 52 includes a product including a non-transitory storage medium having stored thereon instructions that, when executed by a machine, result in communicating a location-enabling message, which is transmitted between first and second location-enabling sources and receivable by a mobile device, the location-enabling message including encrypted location-enabling information (LEI) configured for enabling estimation of a location of the mobile device at a predefined accuracy based on a cryptographic key corresponding to the first location-enabling source.

Example 53 includes the subject matter of Example 52 and optionally, wherein the instructions result in receiving the location-enabling message at the mobile device, and decrypting the encrypted LEI based on the cryptographic key corresponding to the first location-enabling source.

Example 54 includes the subject matter of Example 53 and optionally, wherein the instructions result in deriving the cryptographic key corresponding to the first location-enabling source based on an identifier of the first location-enabling source and a master cryptographic key.

Example 55 includes the subject matter of Example 54 and optionally, wherein the instructions result in receiving the master cryptographic key from a server.

Example 56 includes the subject matter of any one of Examples 53-55 and optionally, wherein the instructions result in estimating the location of the device according to a hyperbolic positioning calculation based on a plurality of location enabling messages communicated between the first and second location-enabling sources.

Example 57 includes the subject matter of Example 52 and optionally, wherein the instructions result in generating the location-enabling message at the first location-enabling source.

Example 58 includes the subject matter of any one of Examples 52-57 and optionally, wherein the location-enabling message comprises first LEI including the encrypted LEI and second LEI, the first LEI to enable estimating the location of the mobile device at a first accuracy level and the second LEI to enable estimating the location of the mobile device at a second accuracy level, the first accuracy level is greater than the second accuracy level.

Example 59 includes the subject matter of Example 58 and optionally, wherein the first LEI includes a first portion of an LEI value and the second LEI includes a second portion of the LEI value.

Example 60 includes the subject matter of Example 59 and optionally, wherein the first portion of the LEI value includes a Least-significant-bit (LSB) portion of the LEI value and the second portion of the LEI includes a Most-Significant-bit (MSB) portion of the LEI value.

Example 61 includes the subject matter of any one of Examples 58-60 and optionally, wherein the first LEI is encrypted by a first cryptographic key and the second LEI is encrypted by a second cryptographic key.

Example 62 includes the subject matter of any one of Examples 52-61 and optionally, wherein the encrypted LEI comprises information enabling estimation of a curve of equal time difference with respect to the first and second location-enabling sources.

Example 63 includes the subject matter of any one of Examples 52-62 and optionally, wherein the encrypted LEI comprises information relating to a time delay between the first and second location-enabling sources.

Example 64 includes the subject matter of Example 63 and optionally, wherein the instructions result in communicating a first location-enabling message including first encrypted LEI representing a first time delay between the first and second location-enabling sources, and a second location-enabling message including second encrypted LEI representing a second time delay between the first and second location-enabling sources, the second time delay between the first and second location-enabling sources is different from the first time delay between the first and second location-enabling sources.

Example 65 includes the subject matter of Example 63 or 64 and optionally, wherein the encrypted LEI includes at least one value selected from the group consisting of a first time of transmission of a first message from the first location-enabling source to the second location-enabling source, a second time of reception of the first message at the second location-enabling source, a third time of transmission of a second message from the second location-enabling source to the first location-enabling source, a fourth time of reception of the second message at the first location-enabling source, a difference between the fourth and first times, a difference between the third and second times, and a time-of-flight between the first and second location-enabling sources.

Example 66 includes the subject matter of any one of Examples 52-65 and optionally, wherein the encrypted LEI comprises information relating to a location of the first location-enabling source.

Example 67 includes the subject matter of any one of Examples 52-66 wherein the location-enabling message comprises a Time of Flight (TOF) message.

Example 68 includes the subject matter of any one of Examples 52-67 and optionally, wherein the first and second location-enabling sources comprise first and second Access Points (APs).

Example 69 includes an apparatus of wireless communication, the apparatus comprising means for communicating a location-enabling message, which is transmitted between first and second location-enabling sources and receivable by a mobile device, the location-enabling message including encrypted location-enabling information (LEI) configured for enabling estimation of a location of the mobile device at a predefined accuracy based on a cryptographic key corresponding to the first location-enabling source.

Example 70 includes the subject matter of Example 69, and optionally comprising means for receiving the location-enabling message at the mobile device, and decrypting the encrypted LEI based on the cryptographic key corresponding to the first location-enabling source.

Example 71 includes the subject matter of Example 70, and optionally comprising means for deriving the cryptographic key corresponding to the first location-enabling source based on an identifier of the first location-enabling source and a master cryptographic key.

Example 72 includes the subject matter of Example 71, and optionally comprising means for receiving the master cryptographic key from a server.

Example 73 includes the subject matter of any one of Examples 70-72, and optionally comprising means for estimating the location of the device according to a hyperbolic positioning calculation based on a plurality of location enabling messages communicated between the first and second location-enabling sources.

Example 74 includes the subject matter of Example 69, and optionally comprising means for generating the location-enabling message at the first location-enabling source.

Example 75 includes the subject matter of any one of Examples 69-74 and optionally, wherein the location-enabling message comprises first LEI including the encrypted LEI and second LEI, the first LEI to enable estimating the location of the mobile device at a first accuracy level and the second LEI to enable estimating the location of the mobile device at a second accuracy level, the first accuracy level is greater than the second accuracy level.

Example 76 includes the subject matter of Example 75 and optionally, wherein the first LEI includes a first portion of an LEI value and the second LEI includes a second portion of the LEI value.

Example 77 includes the subject matter of Example 76 and optionally, wherein the first portion of the LEI value includes a Least-significant-bit (LSB) portion of the LEI value and the second portion of the LEI includes a Most-Significant-bit (MSB) portion of the LEI value.

Example 78 includes the subject matter of any one of Examples 75-77 and optionally, wherein the first LEI is encrypted by a first cryptographic key and the second LEI is encrypted by a second cryptographic key.

Example 79 includes the subject matter of any one of Examples 69-78 and optionally, wherein the encrypted LEI comprises information enabling estimation of a curve of equal time difference with respect to the first and second location-enabling sources.

Example 80 includes the subject matter of any one of Examples 69-79 and optionally, wherein the encrypted LEI comprises information relating to a time delay between the first and second location-enabling sources.

Example 81 includes the subject matter of Example 80, and optionally comprising means for communicating a first location-enabling message including first encrypted LEI representing a first time delay between the first and second location-enabling sources, and a second location-enabling message including second encrypted LEI representing a second time delay between the first and second location-enabling sources, the second time delay between the first and second location-enabling sources is different from the first time delay between the first and second location-enabling sources.

Example 82 includes the subject matter of Example 80 or 81 and optionally, wherein the encrypted LEI includes at least one value selected from the group consisting of a first time of transmission of a first message from the first location-enabling source to the second location-enabling source, a second time of reception of the first message at the second location-enabling source, a third time of transmission of a second message from the second location-enabling source to the first location-enabling source, a fourth time of reception of the second message at the first location-enabling source, a difference between the fourth and first times, a difference between the third and second times, and a time-of-flight between the first and second location-enabling sources.

Example 83 includes the subject matter of any one of Examples 69-82 and optionally, wherein the encrypted LEI comprises information relating to a location of the first location-enabling source.

Example 84 includes the subject matter of any one of Examples 69-83 wherein the location-enabling message comprises a Time of Flight (TOF) message.

Example 85 includes the subject matter of any one of Examples 69-84 and optionally, wherein the first and second location-enabling sources comprise first and second Access Points (APs).

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a location-enabling information (LEI) processor to process a location-enabling message, which is transmitted between first and second location-enabling sources and receivable by a mobile device, said location-enabling message including encrypted LEI configured to enable estimation of a location of said mobile device at a predefined accuracy based on a cryptographic key corresponding to said first location-enabling source, the encrypted LEI including at least one value selected from the group consisting of a first time value representing a time of transmission of a first message from said first location-enabling source to said second location-enabling source, a second time value representing a time of reception of said first message at said second location-enabling source, a third time value representing a time of transmission of a second message from said second location-enabling source to said first location-enabling source, a fourth time value representing a time of reception of said second message at said first location-enabling source, a difference between said fourth and first time values, a difference between said third and second time values, and a time-of-flight between said first and second location-enabling sources.

2. The apparatus of claim 1, wherein said LEI processor is to receive said location-enabling message at said mobile device, and to decrypt said encrypted LEI based on the cryptographic key corresponding to said first location-enabling source.

3. The apparatus of claim 2, wherein said LEI processor is to derive the cryptographic key corresponding to said first location-enabling source based on an identifier of said first location-enabling source and a master cryptographic key.

4. The apparatus of claim 3, wherein said LEI processor is to receive said master cryptographic key from a server.

5. The apparatus of claim 2, wherein said LEI processor is to estimate the location of said mobile device according to a hyperbolic positioning calculation based on a plurality of location enabling messages communicated between said first and second location-enabling sources.

6. The apparatus of claim 1, wherein said LEI processor is to generate said location-enabling message at said first location-enabling source.

7. The apparatus of claim 1, wherein said location-enabling message comprises first LEI including said encrypted LEI and second LEI, said first LEI to enable estimating the location of said mobile device at a first accuracy level and said second LEI to enable estimating the location of said mobile device at a second accuracy level, said first accuracy level is greater than said second accuracy level.

8. The apparatus of claim 7, wherein said first LEI includes a first portion of an LEI value, and said second LEI includes a second portion of said LEI value.

9. The apparatus of claim 8, wherein said first portion of said LEI value includes a Least-significant-bit (LSB) portion of said LEI value, and said second portion of said LEI includes a Most-Significant-bit (MSB) portion of said LEI value.

10. The apparatus of claim 7, wherein said first LEI is encrypted by a first cryptographic key and said second LEI is encrypted by a second cryptographic key.

11. The apparatus of claim 1, wherein said encrypted LEI comprises information enabling estimation of a curve of equal time difference with respect to said first and second location-enabling sources.

12. The apparatus of claim 1, wherein said encrypted LEI comprises information relating to a time delay between said first and second location-enabling sources.

13. An apparatus comprising:
a location-enabling information (LEI) processor to process first and second location-enabling messages, which are transmitted between first and second location-enabling sources and receivable by a mobile device, said first and second location-enabling messages including encrypted LEI configured to enable estimation of a location of said mobile device at a predefined accuracy based on a cryptographic key corresponding to said first location-enabling source, wherein said first location-enabling message includes first encrypted LEI representing a first time delay between said first and second location-enabling sources, and the second location-enabling message includes second encrypted LEI representing a second time delay between said first and second location-enabling sources, said second time delay between said first and second location-enabling sources being different from said first time delay between said first and second location-enabling sources.

14. The apparatus of claim 13, wherein at least one message of said first and second location-enabling messages comprises a Time of Flight (TOF) message.

15. The apparatus of claim 1, wherein said encrypted LEI comprises information relating to a location of said first location-enabling source.

16. The apparatus of claim 1, wherein said location-enabling message comprises a Time of Flight (TOF) message.

17. The apparatus of claim 1, wherein said first and second location-enabling sources comprise first and second Access Points (APs).

18. A system comprising:
a wireless communication device including:
one or more antennas;
at least one wireless communication unit to communicate a location-enabling message, which is transmitted between first and second location-enabling sources and receivable by a mobile device, said location-enabling message including encrypted location-enabling information (LEI) configured for enabling estimation of a location of said mobile device at a predefined accuracy based on a cryptographic key corresponding to said first location-enabling source, the encrypted LEI including at least one value selected from the group consisting of a first time value representing a time of transmission of a first message from said first location-enabling source to said second location-enabling source, a second time value representing a time of reception of said first message at said second location-enabling source, a third time value representing a time of transmission of a second message from said second location-enabling source to said first location-enabling source, a fourth time value representing a time of reception of said second message at said first location-enabling source, a difference between said fourth and first time values, a difference between said third and second time values, and a time-of-flight between said first and second location-enabling sources; and
a LEI processor to process said location-enabling message.

19. The system of claim 18, wherein said wireless communication device comprises said mobile device, said LEI processor is to receive said location-enabling message at said mobile device, and to decrypt said encrypted LEI based on the cryptographic key corresponding to said first location-enabling source.

20. The system of claim 18, wherein said wireless communication device comprises said first location-enabling source, said LEI processor is to generate said location-enabling message at said first location-enabling source.

21. The system of claim 18, wherein said location-enabling message comprises first LEI including said encrypted LEI and second LEI, said first LEI to enable estimating the location of said mobile device at a first accuracy level and said second LEI to enable estimating the location of said mobile device at a second accuracy level, said first accuracy level is greater than said second accuracy level.

22. The system of claim 18, wherein said encrypted LEI comprises information enabling estimation of a curve of equal time difference with respect to said first and second location-enabling sources.

23. A method of wireless communication to be performed at a wireless device, the method comprising:
communicating a location-enabling message, which is transmitted between first and second location-enabling sources and receivable by a mobile device, said location-enabling message including encrypted location-enabling information (LEI) configured for enabling estimation of a location of said mobile device at a predefined accuracy based on a cryptographic key corresponding to said first location-enabling source, the encrypted LEI including at least one value selected from the group consisting of a first time value representing a time of transmission of a first message from said first location-enabling source to said second location-enabling source, a second time value representing a time of reception of said first message at said second location-enabling source, a third time value representing a time of transmission of a second message from said second location-enabling source to said first location-enabling source, a fourth time value representing a time of reception of said second message at said first location-enabling source, a difference between said fourth and first time values, a difference between said third and second time values, and a time-of-flight between said first and second location-enabling sources.

24. The method of claim 23 comprising receiving said location-enabling message at said mobile device, and decrypting said encrypted LEI based on the cryptographic key corresponding to said first location-enabling source.

25. The method of claim 23 comprising generating said location-enabling message at said first location-enabling source.

26. A product including a non-transitory storage medium having stored thereon instructions that, when executed by a machine, result in performing a method at a wireless device, the method comprising:
communicating a location-enabling message, which is transmitted between first and second location-enabling sources and receivable by a mobile device, said location-enabling message including encrypted location-enabling information (LEI) configured for enabling estimation of a location of said mobile device at a predefined accuracy based on a cryptographic key corresponding to said first location-enabling source, the encrypted LEI including at least one value selected from the group consisting of a first time value representing a time of transmission of a first message from said first location-enabling source to said second location-enabling source, a second time value representing a time of reception of said first message at said second location-enabling source, a third time value representing a time of transmission of a second message from said second location-enabling source to said first location-enabling source, a fourth time value representing a time of reception of said second message at said first location-enabling source, a difference between said fourth and first time values, a difference between said third and second time values, and a time-of-flight between said first and second location-enabling sources.

27. The product of claim 26, wherein said instructions result in receiving said location-enabling message at said mobile device, and decrypting said encrypted LEI based on the cryptographic key corresponding to said first location-enabling source.

28. The product of claim 27, wherein said instructions result in deriving the cryptographic key corresponding to said first location-enabling source based on an identifier of said first location-enabling source and a master cryptographic key.

29. The product of claim 26, wherein said instructions result in generating said location-enabling message at said first location-enabling source.

30. The product of claim 26, wherein said location-enabling message comprises first LEI including said encrypted LEI and second LEI, said first LEI to enable estimating the location of said mobile device at a first accuracy level and said second LEI to enable estimating the location of said mobile device at a second accuracy level, said first accuracy level is greater than said second accuracy level.

* * * * *